United States Patent
Moore et al.

(10) Patent No.: US 9,264,444 B2
(45) Date of Patent: *Feb. 16, 2016

(54) SYSTEMS AND METHODS FOR DETERMINING AN OBJECTIVE SECURITY ASSESSMENT FOR A NETWORK OF ASSETS

(71) Applicant: Rapid7, LLC, Boston, MA (US)

(72) Inventors: HD Moore, Austin, TX (US); Roy Donald Hodgman, Boston, MA (US); Dana Elizabeth Wolf, Boston, MA (US); Matthew Robert Hathaway, Boston, MA (US)

(73) Assignee: RAPID7, LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,093

(22) Filed: May 21, 2013

(65) Prior Publication Data

US 2014/0351939 A1 Nov. 27, 2014

(51) Int. Cl.
*H04L 29/06* (2006.01)
*G06F 21/55* (2013.01)

(52) U.S. Cl.
CPC .......... *H04L 63/1433* (2013.01); *G06F 21/554* (2013.01)

(58) Field of Classification Search
CPC .......................... G06F 21/554; H04L 63/1433
USPC ......................................................... 726/25
See application file for complete search history.

(56) References Cited

U.S. PATENT DOCUMENTS

| | | | | |
|---|---|---|---|---|
| 7,584,508 B1* | 9/2009 | Kashchenko | ......... | H04L 63/105 726/25 |
| 2002/0026591 A1* | 2/2002 | Hartley | ............... | H04L 63/1433 726/25 |
| 2004/0006704 A1* | 1/2004 | Dahlstrom | ............ | G06F 21/577 726/25 |
| 2007/0180525 A1* | 8/2007 | Bagnall | .................. | G06Q 10/10 726/23 |
| 2009/0199265 A1* | 8/2009 | Hudis | ................... | G06F 21/577 726/1 |
| 2011/0138471 A1* | 6/2011 | Van De Weyer | ...... | G06F 21/554 726/25 |
| 2012/0096558 A1* | 4/2012 | Evrard | ................ | H04L 63/1416 726/25 |
| 2013/0097709 A1* | 4/2013 | Basavapatna | ......... | G06F 21/552 726/25 |
| 2014/0173738 A1* | 6/2014 | Condry | .................. | G06F 21/568 726/25 |

* cited by examiner

*Primary Examiner* — Dao Ho
(74) *Attorney, Agent, or Firm* — MH2 Technology Law Group, LLP (57) ABSTRACT

A security assessment tool can determine computer assets in a network and provide an overall security score for the network. The overall security score can represent an objective measure of the security of the network that considers potential security threats to the computer assets, counter measures deployed in the network to address the potential security threats, and the effectiveness of the counter measures. Based on the overall security assessment, the security assessment tool can provide recommendations for improving the security of the network.

34 Claims, 6 Drawing Sheets

SYSTEMS AND METHODS FOR DETERMINING AN OBJECTIVE SECURITY ASSESSMENT FOR A NETWORK OF ASSETS

CROSS-REFERENCE TO RELATED APPLICATIONS

This application is related to U.S. patent application Ser. No. 13/899,117 filed May 21, 2013, entitled "SYSTEMS AND METHODS FOR ASSESSING SECURITY FOR A NETWORK OF ASSETS AND PROVIDING RECOMMENDATIONS" by Chad Loder, Dana Elizabeth Wolf, and Matthew Robert Hathaway, the disclosure of which is incorporated by reference herein in its entirety.

BACKGROUND

In today's distributed computing environments, security is of the utmost importance. Due to the rise of wide-area public networks, users have unlimited access to content, e.g. data, files, applications, programs, etc., from a variety of sources. Additionally, the users' connection to the public networks provides a window for malicious entities to attack the users' computing systems. Malicious entities utilize this ease of accessibility and anonymity to attack the users. For example, the malicious entities can plant viruses, Trojans, or other malicious agents in publicly available content in order to attack the users' computing systems and steal sensitive information from the users and can attack the users' system remotely across the public networks.

To identify security risks in computing systems and networks, users and administrators employ vulnerability assessment and security assessment tools. These tools can identify vulnerabilities in computing systems and networks but only provide discrete information about the vulnerabilities (i.e. that a vulnerability exists). Accordingly, the tools do not provide any assessment of the vulnerabilities within the context of the overall network security.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

According to implementations, systems and methods are directed to providing an overall security assessment of a network of computer assets. In implementations, a security assessment tool can determine computer assets in a network and provide an overall security score for the network. The overall security score can represent an objective measure of the security of the network that considers potential security threats to the computer assets, counter measures deployed in the network to address the potential security threats, and the effectiveness of the counter measures. Based on the overall security assessment, the security assessment tool can provide recommendations for improving the security of the network.

Figure 1A:
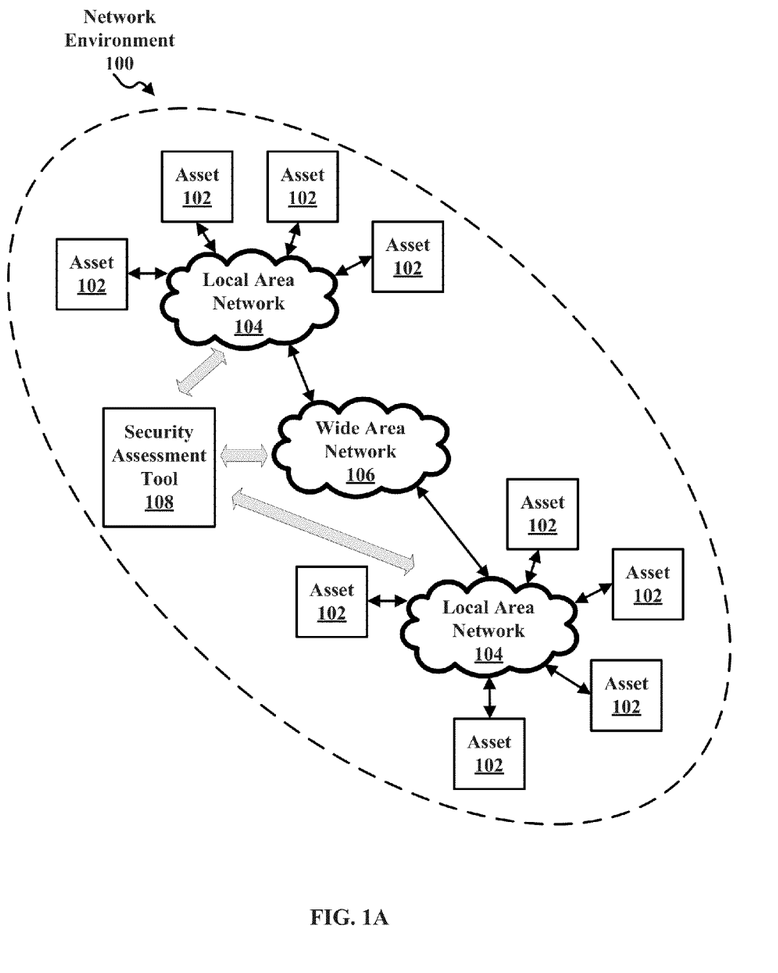
FIGS. 1A and 1B illustrate an example of a network environment in which an overall security assessment can be performed, according to various implementations.
Figure 1B:
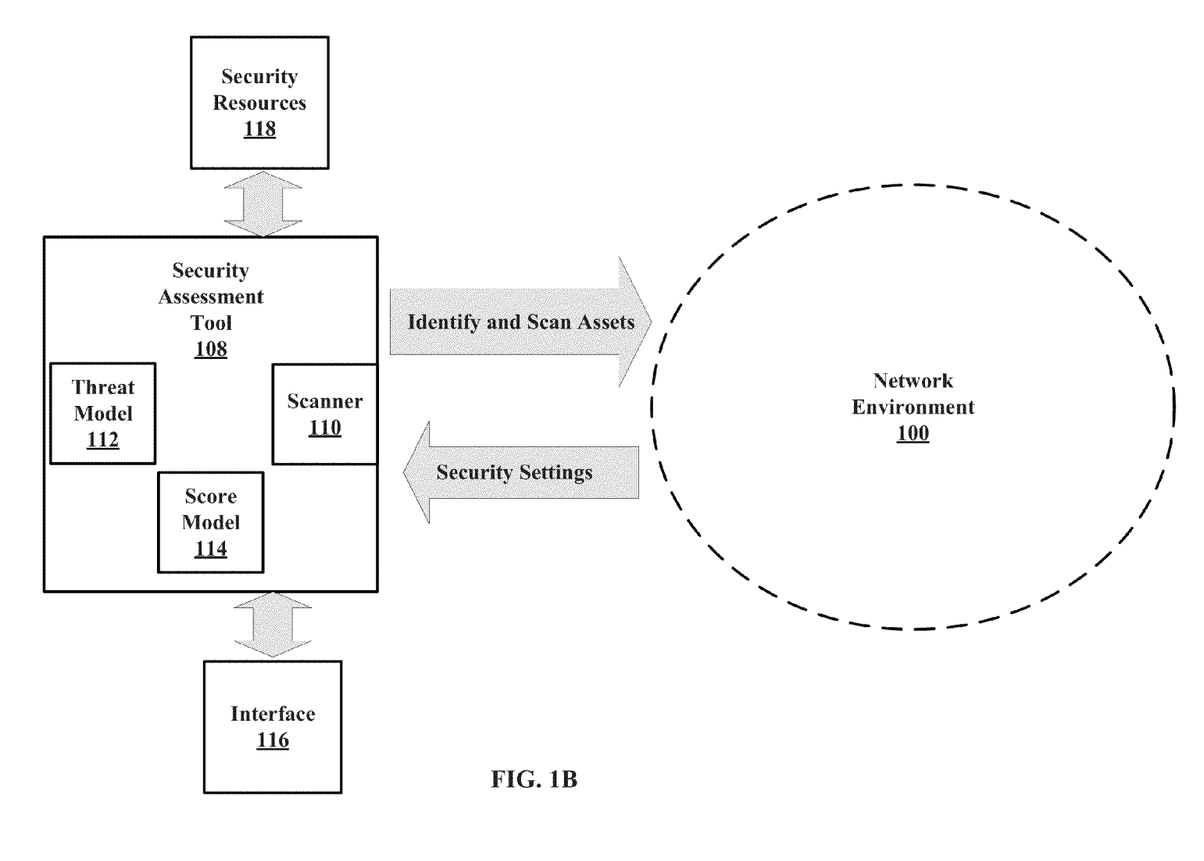

FIGS. 1A and 1B illustrate an example of a network environment 100, in which a security assessment can be performed, according to various implementations. While FIGS. 1A and 1B illustrate various components contained in the network environment 100, FIGS. 1A and 1B illustrate one example of a network environment and additional components can be added and existing components can be removed.

As illustrated in FIG. 1A, the network environment 100 can represent the computer systems and network hardware of public or private entities, such as governmental agencies, individuals, businesses, partnerships, companies, corporations, etc., utilized to support the entities. The network environment 100 can include a number of computer assets 102. The computer assets 102 can be connected by one or more local area networks 104 and one or more wide area network 106. In implementations, a security assessment tool 108 can be configured to assess the security of the network environment 100 and provide an overall security score for the network environment 100.

The computer assets 102 can include any type of conventional computer systems that are operating with the network environment 100 or supporting the network environment 100. For example, the network environment 100 can include various types of servers, such as file servers, web servers, application servers, database servers, email servers and the like, that provide services within the network environment 100. Likewise, for example, the computer assets 102 can include laptop computers, desktop computers, tablet computers, mobile phones, and the like used by the personnel of the entities.

Additionally, for example, the computer assets 102 can include other hardware and computer systems that support the network environment 100. For example, the computer assets 102 can include gateways, routers, wireless access points, firewalls, and the like that support any type of communications networks, such as the local area network 104 and the wide area networks 106, to allow the computing systems in the network environment 100 to communicate. In any of the examples, the computer systems in the network environment 100 can include hardware resources, such as processors, memory, network hardware, storage devices, and the like, and software resources, such as operating systems (OS), application programs, and the like.

In addition to physical computer systems, the computer assets 102 can include virtualized computer systems, such as virtual machines (VM). A VM can be a virtualized computer system, or a software implementation of a computer system layered on top of any of physical computer system. The VM's access to the underlying computer system can be controlled through a hypervisor or virtual machine monitor. The VMs can provide for multiple and/or different operating system environments to run concurrently on a single computer system.

While several examples of the computer assets 102 have been described above, the computer assets 102 can include any system, whether physical or virtual, that performs computing processes in the network environment 100. Additionally, the computer assets 102 in the network environment 100 can be located at any location, whether located at single geographic location or remotely located from each other. For example, the network environment 100 can represent the computer assets 102 of a company that is located in multiple geographic locations. As such, one or more of the computer assets 102 can be located at one location (e.g. one office of the company) and one or more of the computer assets 102 can be located at one or more different locations (e.g. satellite offices of the company).

In implementations, the security assessment tool 108 can be configured to assess the overall security of the network environment 100. The security assessment tool 108 can be configured to identify the computer assets 102 of the network environment 100. Once identified, the security assessment tool 108 can be configured to determine the security information of the network environment 100 and the computer assets 102. Based on the security information, the security assessment tool 108 can be configured to determine potential security threats to the network environment 100 and the computer assets 102. Likewise, based on the security information, the security assessment tool 108 can be configured to determine counter measures that are deployed in the network environment 100 and deployed on the computer assets 102 to address the potential security threats. Based on the effectiveness of the deployed counter measures, the security assessment tool 108 can be configured to provide an overall assessment of the security of the network environment 100. Based on the overall security assessment, the security assessment tool 108 can be configured to provide recommendations for improving the security of the network environment 100.

As described herein, a security threat can be any process, method, technique, algorithm, condition, software program, policy, and the like that can be utilized to compromise the security of the network environment 100. For example, a security threat can include known threat vectors for computer assets 102 and the network environment 100, such as known malware, known exploits, known viruses, and the like. A counter measure can include processes, techniques, methods, algorithms, conditions, policies, software programs and the like that can be implemented in the network environment 100 to address potential security threats.

Security information can include any information about the structure of the network environment 100 and any information about the computer assets 102. For example, the security information can include security details of the network environment 100, such as security polices of the network environment 100, details of computer assets 102 (e.g. firewalls) providing security in the network environment 100, and the like. Likewise, for example, the security information can include security details of the computer assets 102, such as the configuration of the computer assets 102, system setting of the computer assets 102, software programs including security software programs installed on the computer assets 102, security settings of the computer assets 102, configuration policies of the computer assets 102, security policies of the computer assets 102, access information for the computer assets 102, and details of software programs installed on the computer assets.

In implementation, the security assessment tool 108 can be configured as a software program that is capable of being stored on and executed by a computer system, whether part of the network environment 100 or external to the network environment 100. The security assessment tool 108 can be written in a variety of programming languages, such as JAVA, C++, Python code, Visual Basic, hypertext markup language (HTML), extensible markup language (XML), and the like to accommodate a variety of operating systems, computing system architectures, etc. FIG. 1B illustrates a more detailed view of the security assessment tool 108. As illustrated, the security assessment tool 108 can be configured as a stand-alone software program and can include a scanner 110, a threat model 112, a score module 114, and one or more interfaces 116. While FIG. 1B illustrates the components as being part of the security assessment tool 108, the components can be separate software programs that communicate with the security assessment tool 108. Likewise, the security assessment tool 108, itself, can be a component of another software program.

The scanner 110 can include one or more software modules or tools that can scan the network environment 100 and the computer assets 102. The scanner 110 can be configured to determine the structure of the network environment 100 and identify the computer assets 102. Likewise, the scanner 110 can be configured to determine the security information for the network environment 100. Accordingly, the scanner 110 can be configured to include the necessary logic, commands, algorithms, and code to scan the network environment 100 and to communicate computer assets 102. For example, the scanner 110 can include various types of network scanners and vulnerability scanners, such as NeXpose™ or Metasploit™ from Rapid7, LLC.

The threat model 112 can be a listing of known security threats to network environments. The threat model 112 can include the identification of the known security threats and details of the security threats. The details can include the types of the computer assets 102 that are vulnerable to the known security threats, the affect of the known security threats, one or more counter measures that address the known security threats, and the like.

The score model 114 can include the necessary logic, commands, algorithms, and code utilized by the security assessment tool 108 to determine the overall security assessments and provide recommendations as described herein. The score model 114 can include a listing of the counter measures to security threats and a weighting value associated with each of the counter measures. The weighting value can represent the effectiveness of a particular counter measure.

The security assessment tool 108 can also include an interface 116. The interface 116 can be configured to allow one or more users to interact with the security assessment tool 108. The interface 116 can be configured to provide one or more graphical user interfaces (GUIs) and/or command-line interfaces to allow a user to interact with the security assessment tool 108. Likewise, the interface 116 can be configured to provide one or more application programming interfaces (APIs) to allow other software programs to interact with the security assessment tool 108. As described herein, the security assessment tool 108 will be described with reference to a user interacting with the security assessment tool 108. In implementations, a user can include a one or more persons and/or one or more software programs that can interact with the security assessment tool 108.

In implementations, a user can utilize the interface 116 to interact with the security assessment tool 108 to perform the overall security assessment. The user can utilize the interface 116 to initiate a security assessment of the network environment 100. The user can utilize the interface 116 to enter information about the network environment 100 and the computer assets 102. For example, the user can enter information about the structure of the network environment 100 such as network addresses of the network environment 100. Likewise, for example, the user can enter information about the computer assets 102, such as identification of the computer assets 102, access information for the computer assets 102, and the like. The security assessment tool 108, for example, the scanner 110, can utilize the information provided by the user when identifying the computer assets 102 and when determining the security information for the network environment 100.

The security assessment tool 108 can utilize the interface 116 to output the results of the overall security assessment. The results can include the security score relative to the potential security threats and the overall security score determined by the security assessment tool 108. The results can also include one or more recommendations for improving the security score relative to the potential security threats and the overall security score. For example, the one or more recommendations can include deploying a new counter measure, changing a security setting of the computer assets 102, changing a system setting of the computer assets 102, changing a security policy of the computer systems 102, updating software of the computer assets 102, installing security software on the computer assets 102, and improving access information for the computer assets 102.

As illustrated, the security assessment tool 108 can be configured to access one or more security resources 118. The security resources 118 can be a source, whether internal or external to the network environment 100, that provides information about security threats and counter measures. For example, the security resources 118 can include security experts, security forums, security literature, empirical security testing platforms, and the like. Likewise, for example, the security resource 118 can include the user of the security assessment tool 108. The security assessment tool 108 can utilize the security resources 118 to generate and update the threat model 112. The security assessment tool 108 can also utilize the security resources 118 to generate and update the score model 114. For example, the security assessment tool 108 can utilize the security resources 118 to determine effectiveness metrics for the counter measures. The effectiveness metrics can be utilized to determine and update the weighting values for the counter measures.

Figure 2:
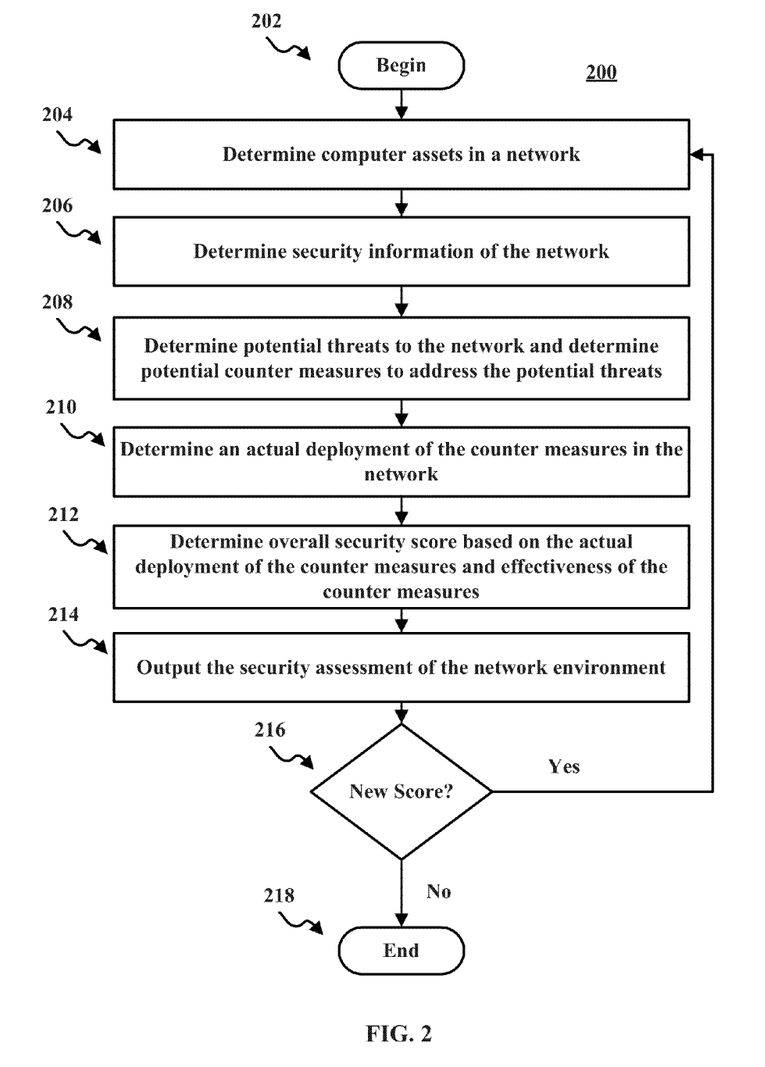
FIG. 2 illustrates an example of a process for determining an overall security assessment of a network environment, according to various implementations.

FIG. 2 illustrates an example of a process 200 for assessing the security of the network environment 100, according to various implementations. The illustrated stages of the process 200 are examples and that any of the illustrated stages can be removed, additional stages can be added, and the order of the illustrated stages can be changed.

As illustrated, at 202, the process can begin. At 204, the security assessment tool 108 can determine the computer assets 102 in the network environment 100. The security assessment tool 108 can scan the network environment 100 to identify the computer assets 102 in the network environment 100. Likewise, the security assessment tool 108 can receive an identification of computer assets 102 from a user of the security assessment tool 108. Additionally, the security assessment tool 108 can receive, from a user, information about the network environment 100 and the computer assets 102 to assist in scanning the network environment 100.

In 206, the security assessment tool 108 can determine security information of the network environment 100. The security assessment tool 108 can scan the network environment 100 and the computer assets 102 to identify security information. Likewise, the security assessment tool 108 can receive the security information from a user of the security assessment tool 108. Additionally, the security assessment tool 108 can receive, from a user, information about the network environment 100 and the computer assets 102 to assist in scanning the network environment 100.

The security information can include any information about the structure of the network environment 100 and any information about the computer assets 102. For example, the security information can include security details of the network environment 100, such as security polices of the network environment 100, details of computer assets 102 (e.g. firewalls) providing security in the network environment 100, and the like. Likewise, for example, the security information can include security details of the computer assets 102, such as the configuration of the computer assets 102, system setting of the computer assets 102, software programs including security software programs installed on the computer assets 102, security settings of the computer assets 102, configuration policies of the computer assets 102, security policies of the computer assets 102, access information for the computer assets 102, and details of software programs installed on the computer assets.

In 208, the security assessment tool 108 can determine potential security threats to the network and determine counter measures to address the potential security threats. Based on the security information, the security assessment tool 108 can examine the threat model 112 to identify the potential security threats to the network environment 100. Additionally, from the threat model 112, the security assessment tool 108 can identify counter measure that can address the potential security threats to the network environment 100.

For example, based on the type and configurations of computer assets 102, the security assessment tool 108 can determine potential security threats. For instance, if one or more of the computer assets 102 are running a particular OS or a particular software program, the security assessment tool 108 can determine any potential security threats and any counter measures that are applicable to the particular OS or software program. Likewise, for instance, if one or more of the computer assets 102 are connected to a public network (e.g. the internet), the security assessment tool 108 can determine any potential security threats and any counter measures that are associated with public networks.

In 210, the security assessment tool 108 can determine an actual deployment of the counter measures in the network. Based on the security information and potential security threats, the security assessment tool 108 can determine which counter measures are actually deployed in the network environment 100 and on the computer assets 102. The security assessment tool 108 can determine which of counter measures are deployed and the coverage of the counter measures (e.g. on which computer assets 102 are the counter measures deployed).

In 212, the security assessment tool 108 can determine an overall security score for the network. The security assessment tool 108 can determine the overall security score based on potential security threats to the network environment 100, the actual deployment of the counter measures in the network environment 100, and effectiveness on the deployed counter measures. The overall security score can include security scores for different security threats. The security score for each security threat can reflect the actual deployment of counter measures for each counter measure and the effectiveness of the deployed counter measures. The overall security score can be the combination of the security scores for each potential security threat.

The security score for each potential security threat and the overall security score can be a numerical value that represents the overall security score for the network environment 100, where a higher numerical value represents better security relative to lower numerical values. For example, the security score for each potential security threat and overall security score can be a numerical value between "0" and "10," where "0" represents no security for potential security threats and "10" represents complete coverage for the potential security threats. For instance, if for a particular security threat, the network environment 100 has deployed, on 100% of the computer assets 102, a counter measure that is 50% effective in mitigating a the particular security threat. In this instance, the security assessment tool 108 can determine that the overall security score is 5.

In 214, the security assessment tool 108 can output the security assessment for the network environment 100. For example, the security assessment tool 108 can output the security score for each potential security threat and overall security score via the interface 116. The security assessment tool 108 can output the value of the security score for each potential security threat and overall security score in addition to recommendations to improve the overall security score. Examples of the output of the security assessment and the recommendations can be found in related application, U.S. patent application Ser. No. 13/899,117 filed May 21, 2013, entitled "SYSTEMS AND METHODS FOR ASSESSING SECURITY FOR A NETWORK OF ASSETS AND PROVIDING RECOMMENDATIONS" by Chad Loder, Dana Elizabeth Wolf, and Matthew Robert Hathaway, the disclosure of which is incorporated by reference herein in its entirety In 216, the security assessment tool 108 can repeat the process above, over time, to determine new overall security scores. As new security threats arise, computer assets are added and removed from the network, new counter measures are determined, and as new counter measured are deployed, the security assessment tool 108 can determine new security score for each potential security threat and a new overall security score. Likewise, the security assessment tool 108 can determine impact of the changes on the new scores.

In 218, the process can end, repeat, or return to any point.

Figure 3:
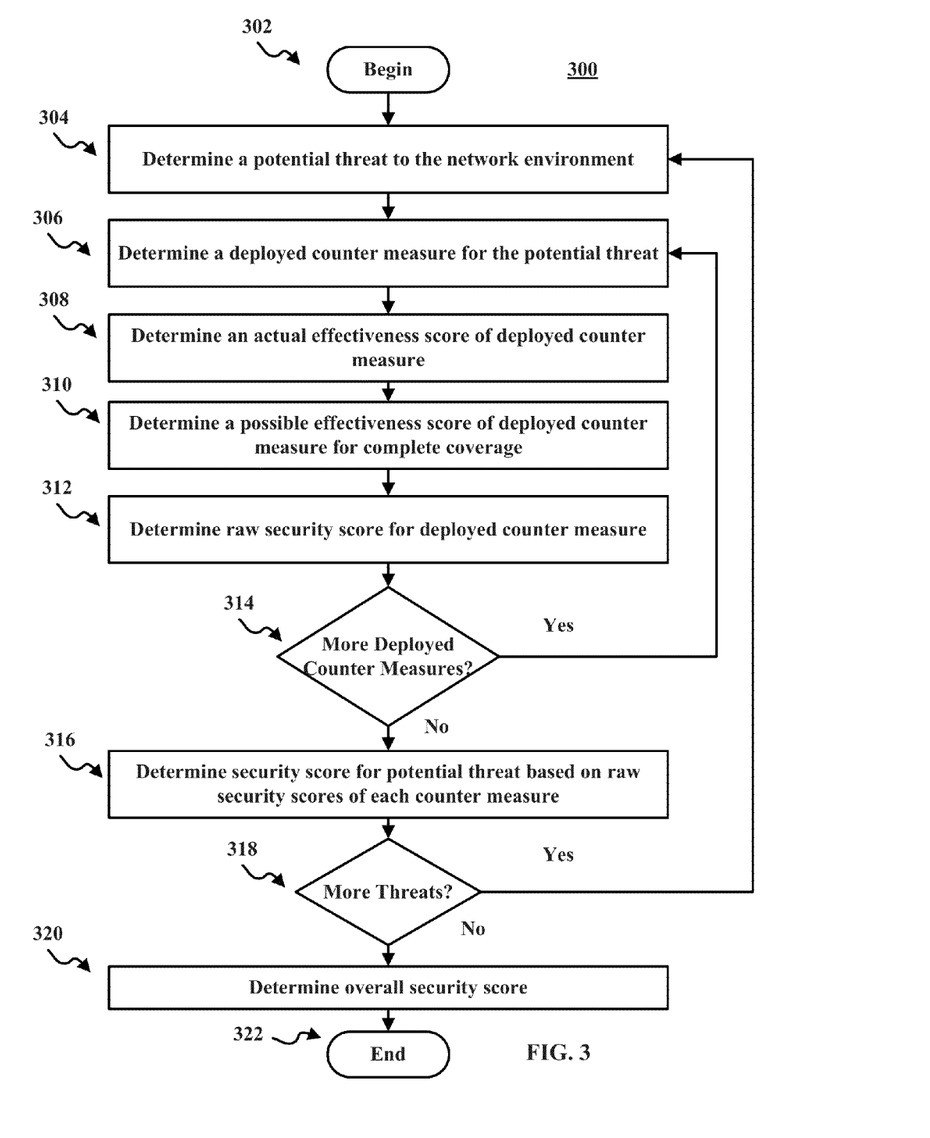
FIG. 3 illustrates an example of a process for determining an overall security score for a network environment, according to various implementations.

FIG. 3 illustrates an example of a process 300 for determining an overall security score, according to various implementations. The illustrated stages of the process 300 are examples and that any of the illustrated stages can be removed, additional stages can be added, and the order of the illustrated stages can be changed.

As illustrated, at 302, the process can begin. In 304, the security assessment tool 108 can determine a potential security threat to the network environment 100. As mentioned above, the security assessment tool 108 can scan the network environment 100 to determine the security information for the network environment 100. Likewise, the security assessment tool 108 can receive the security information from one or more users via an interface of the security assessment tool 108. Based on the security information, the security assessment tool 108 can determine a potential security threat to the network environment 100. In 306, the security assessment tool 108 can determine a deployed counter measure for the potential security threat. As mentioned above, from the security information, the security assessment tool 108 can identify a particular counter measure, for the potential security threat, that is actually deployed in the network environment 100.

For example, a particular security threat to the network environment 100 can be a malware program that attacks a particular version of a known software program. A possible counter measure can be antivirus installed on the computer assets 102, with network access, in the network environment 100. Based on the security information, the security assessment tool 108 can determine that one or more of the computer assets 102 have installed the particular software program. Continuing this example, the security assessment tool 108 can determine that one or more of the computer assets 102 have an antivirus counter measure installed.

In 308, the security assessment tool 108 can determine an actual effectiveness score of the deployed counter measure. The actual effectiveness score can represent the coverage of the counter measure (e.g. how extensive is the deployment of the counter measures) and the effectiveness of the counter measures. Based on the computer assets 102 and the security information, the security assessment tool 108 can determine the possible coverage of the counter measure, e.g. possible ways the counter measure can be deployed in the network environment. Based on the computer assets 102 and the security information, the security assessment tool 108 can determine the actual deployment of the counter measure.

The actual effectiveness score can be given by the equation:

$$\text{actual effectiveness} = \text{percentage coverage} \times \text{weighting value}$$

where weighting value represents the effectiveness of the counter measure and $$\text{percentage coverage} = \left(\frac{\text{actual deployment}}{\text{possible deployment}}\right).$$

In 310, the security assessment tool 108 can determine a possible effectiveness score of the deployed measure for a complete coverage. That is, the possible effectiveness score can represent all possible ways that a counter measure can be deployed in the network environment 100 and the effectiveness of the counter measures. The possible effectiveness score can be given by the equation:

$$\text{possible effectiveness} = (1.0) \times \text{weighting value} = \text{weighting value}.$$

Continuing the above example, the possible coverage would be the antivirus being installed on all the computer assets 102. If, for example, the network environment 100 included "100" (possible deployment) computer assets 102 and only "50" (actual deployment) of these computer assets included antivirus, then the percentage coverage would be "0.5" or "50%." In this example, the effectiveness of the antivirus can be given a weighting value of "0.75." That is, if the counter measure was "100%" deployed, the counter measure would receive a possible effectiveness score of "0.75" (possible coverage*weighting factor). In this example, the actual effectiveness score for the antivirus counter measure can be "0.38" (percentage coverage*weighting factor).

In 312, the security assessment tool 108 can determine a raw security score for the deployed counter measure. The raw security score represents the actual effectiveness score normalized relative to the possible effectiveness score. The raw security score can be given by the equation:

$$\text{raw secuity score} = \frac{\text{actual effectiveness}}{\text{possible effectiveness}}$$

Continuing the example above, for the antivirus counter measure, the raw security score is "0.50" ("0.38"/"0.75").

In 314, the security assessment tool 108 can repeat the process for each counter measure for the potential threat deployed in the network. For each counter measure for a particular security threat, the security assessment tool 108 can determine a raw security score as described above.

In 316, once all the raw security scores are determined, the security assessment tool 108 can determine a security score for the potential threat. The security score can be based on the raw security scores for each deployed counter measure. The security score for a potential security threat can be determined by the equation:

$$\text{security score} = \left( \frac{\sum \text{actual effectiveness all counter measures}}{\sum \text{possible effectiveness all counter measures}} \right) \times \text{scaling factor}$$

where the scaling factor shifts the security score into a range of possible security scores.

Continuing the above example, the security score can be within a range of "0" to "10" and the scaling factor can be "10." If only the antivirus counter measure is the only counter measure, the security assessment tool 108 can determine that the security score for the potential threat is "5.0" ("0.50"*"10").

Likewise, in the above example, another possible counter measure can be deployed to address the particular malware threat. For example, the network environment 100 can implement a counter measure of updating the particular version of the software program to the latest version. In this example, only "80" of the computer assets 102 can include the update to the latest version of the software program, and then the percentage coverage would be "0.8" or "80%." In this example, the effectiveness of the antivirus can be given a weighting value of "1.0." That is, if the particular software program is updated to the latest version, the malware security threat can have little or no security impact on the security of the network environment 100. In this example, if the update counter measure was 100% deployed, the counter measure would receive a possible effectiveness score of 1.0. The actual effectiveness score for the updated software program counter measure can be "0.80" (percentage coverage*weighting factor). The security assessment tool 108 can determine that the raw security score is "0.80".

Continuing this example, the security assessment tool 108 can combine the raw security score for the antivirus counter measure and the update counter measure to determine the security score for the particular malware security threat. In particular, the security assessment tool 108 can determine that the security score for the particular malware security threat is 6.7 out of 10 ((0.38+0.80)/(0.75+1.0)*10=0.67*10).

In 318, the security assessment tool 108 can repeat the process for more security threats. For each potential security threat, the security assessment tool 108 can determine a security score for each potential threat as described above. In 320, the security assessment tool 108 can determine an overall security score for the network environment 100. The overall security score can represent the combination of the security scores for all the potential security threats and deployed counter measures. The security score for a potential security threat can be determined by the equation:

$$\text{security score} = \left( \frac{\sum \text{actual effectiveness all security threats}}{\sum \text{possible effectiveness all security threats}} \right) \times \text{scaling factor}$$

where the scaling factor shifts the security score into a range of possible security scores.

In 322, the process can end, repeat, or return to any point.

Figure 4:
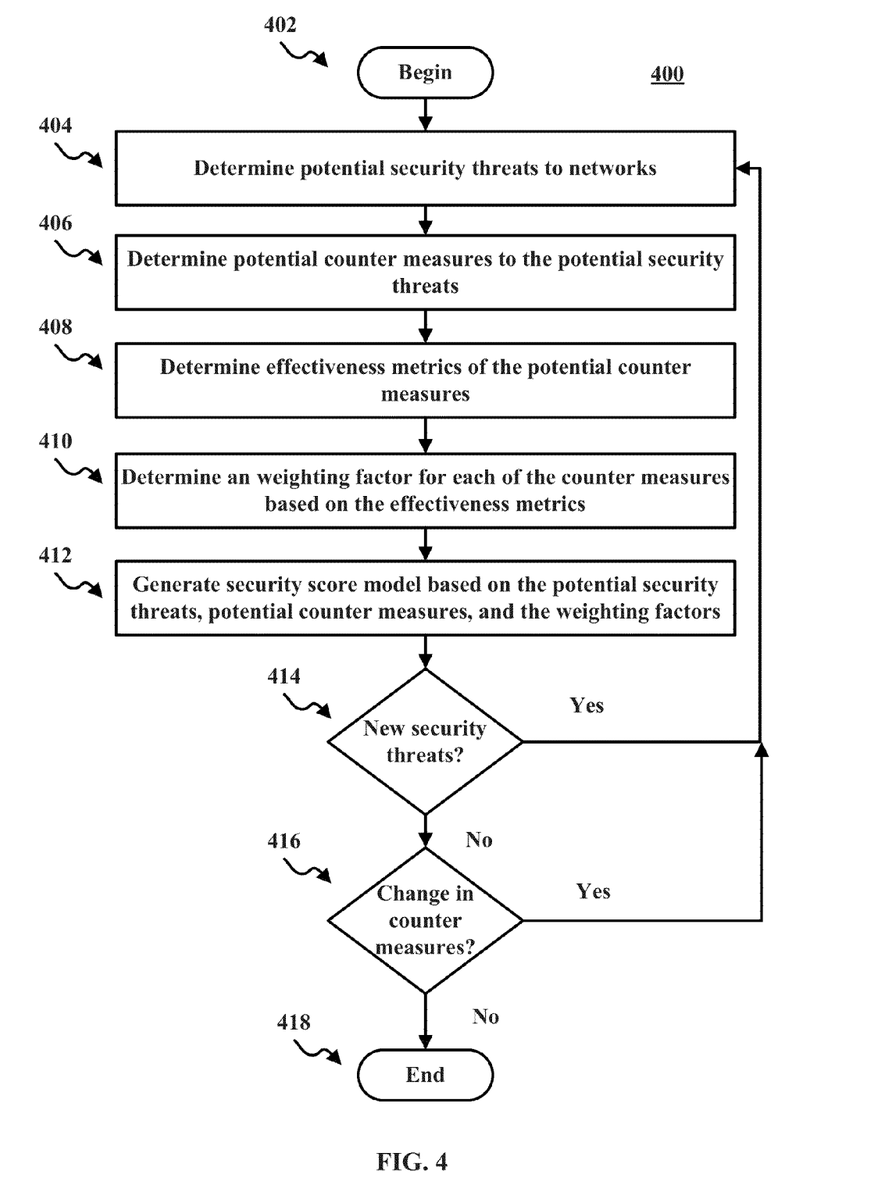
FIG. 4 illustrates an example of generating a scoring model for an overall security assessment, according to various implementations.

FIG. 4 illustrates an example of a process 400 for generating a security score model, according to various implementations. The illustrated stages of the process 400 are examples and that any of the illustrated stages can be removed, additional stages can be added, and the order of the illustrated stages can be changed.

As illustrated, at 402, the process can begin. At 404, the security assessment tool 108 can determine potential security threats to networks. At 406, the security assessment tool 108 can determine potential counter measures to the potential security threats. The security assessment tool 108 can access the security resources 118 and determine the potential security threats and counter measures for the potential security threats. The security assessment tool 108 can store the potential counter measures and the potential security threats in the threat model 112.

The security resources 118 can be a source, whether internal or external to the network environment 100, that provides information about security threats and counter measures. For example, the security resources 118 can include security experts, security forums, security literature, empirical security testing platforms, and the like. Likewise, for example, the security resource 118 can include the user of the security assessment tool 108.

At 408, the security assessment tool 108 can determine effectiveness metrics of the potential counter measures. The security assessment tool 108 can access the security resources 118 and determine the effectiveness metrics. The effectiveness metrics can include quantitative and qualitative data on the effectiveness of the counter measures.

For example, if a security resource 118 is a security expert, security forum, or security literature, the effectiveness metrics can include one or more lists that rank one or more counter measures for a potential security threat. The ranking in the list can be based on the experience and observations of security experts and professional as to the effectiveness of a counter measures. If, for example, a particular counter measure is ranked 1 out of 10 on a list of counter measures, the effectiveness metrics can be 1.0 or 100% effective. Likewise, for example, if a particular counter measure is ranked 3 out of 10 on a list of counter measures, the effectiveness metrics can be 0.7 or 70% effective.

Likewise, if a security resource 118 is an empirical security testing platform, the effectiveness metrics can include a score or ranking describing how well a counter measure performed in various security tests. For instance, a security testing platform can operate a testing environment in which a counter measure is tested against attacks and exploits. If, for example, a particular counter measure was effective against 70 out of 100 attacks and exploits, the effectiveness metrics can be 0.7 or 70% effective.

At 410, the security assessment tool 108 can determine a weighting factor for each of the counter measure. The weighting factor can be based on the effectiveness metrics. For example, the weighting factor can be based on the effectiveness metrics from one of the security resources 118. For instance, if the security assessment tool 108 utilizes the list of ranked counter measures from a security resource 118, the weighting factor can be based on the ranking in the list. If a particular counter measure is ranked 3 out of 10 on a list of counter measures, the effectiveness metrics can be 0.7 or 70% effective, and the security assessment tool 108 can determine that the weighting factor is 0.7.

Additionally, for example, the security assessment tool 108 can utilize the effectiveness metrics from multiple security resources 118. If, for example, a particular counter measure is ranked 1 out of 10 on a list of counter measures, the effectiveness metrics can be 1.0 or 100% effective. Additionally, for example, if the particular counter measure is tested by a security testing platform and determined to be effective against 70 out of 100 attacks and exploits, the effectiveness metrics can be 0.7 or 70% effective. The security assessment tool 108 can combine the effective metrics to determine the weighting factor.

One skilled in the art will understand that any type of procedure, method, or algorithm can be utilized to combine the effectiveness metrics. For example, the security assessment tool 108 can average the effectiveness metrics to determine the weighting factor. For instance, in the above example, the security assessment tool 108 can determine that weighting factor is 0.85 (1.0+0.7/2). Additionally, for example, when determining the average, the security assessment tool 108 can weight one of the effectiveness metrics from one or more of the security resources 118 higher when combining the effectiveness metrics. For example, if a particular security resource 118 is deemed for accurate, reliable, or trustworthy, the effectiveness metrics from the particular security resource 118 can be weighted higher than effectiveness metrics from other security resources 118.

At 412, the security assessment tool 108 can generate a security score model. The security score model can be based on the potential security threats, the potential counter measures, and the weighing factors. The security assessment tool 108 can generate the necessary logic, algorithms, commands, instructions, and code to perform the processes described above.

At 414, the security assessment tool 108 can determine, over time, if new security threats exist. As new security threats are identified, the security assessment tool 108 can update the threat model and the scoring model using the processes described above.

At 416, the security assessment tool 108 can determine, over time, changes in the counter measures. As counter measures change over time, the security assessment tool 108 can update the threat model and the scoring model using the processes described above.

At 418, the process can end, repeat, or return to any point.

Figure 5:
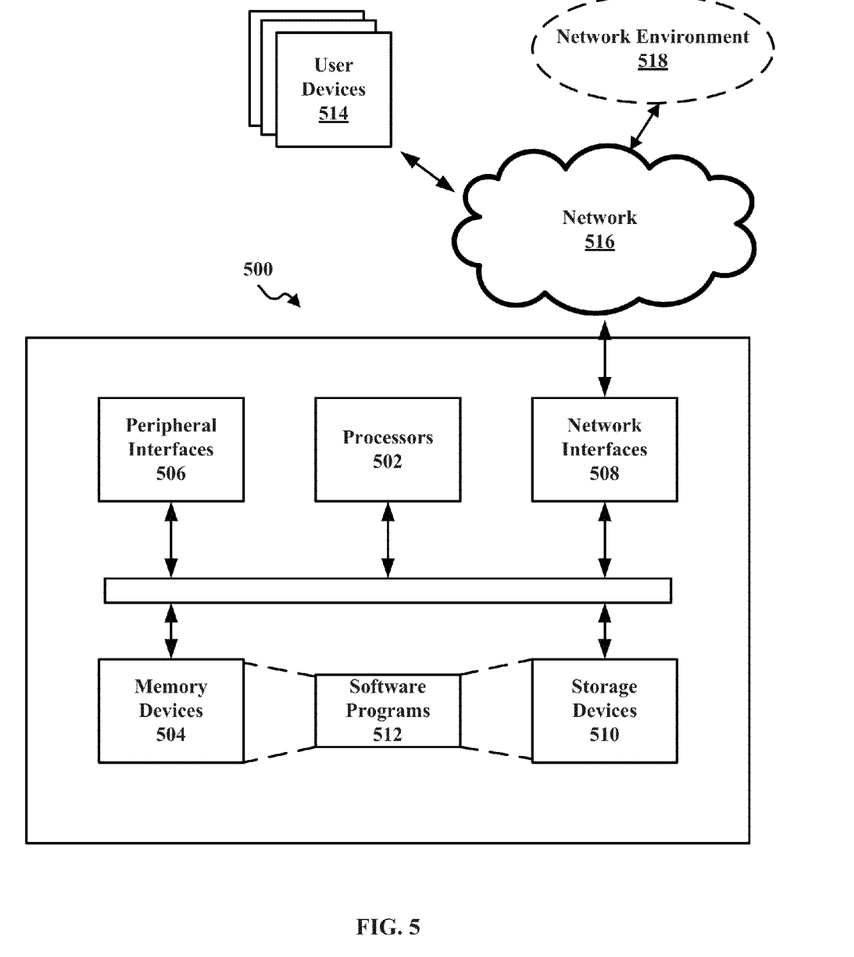
FIG. 5 illustrates an example of a computer device, according to various implementations.

FIG. 5 illustrates an example of a hardware configuration for a computing device 500 implementing the security assessment tool 108 that can be used to perform one or more of the processes described above. While FIG. 5 illustrates various components contained in the computing device 500, FIG. 5 illustrates one example of a computing device and additional components can be added and existing components can be removed.

As illustrated in FIG. 5, the computing device 500 can include one or more processors 502 of varying core configurations and clock frequencies. The computing device 500 can also include one or more memory devices 504 that serve as a main memory during the operation of the computing device 500. For example, during operation, a copy of the security assessment tool 108 can be stored in the one or more memory devices 504. The computing device 500 can also include one or more peripheral interfaces 506, such as keyboards, mice, touchpads, computer screens, touchscreens, etc., for enabling human interaction with and manipulation of the computing device 500.

The computing device 500 can also include one or more network interfaces 508 for communicating via one or more networks, such as Ethernet adapters, wireless transceivers, or serial network components, for communicating over wired or wireless media using protocols. The computing device 500 can also include one or more storage device 510 of varying physical dimensions and storage capacities, such as flash drives, hard drives, random access memory, etc., for storing data, such as images, files, and program instructions for execution by the one or more processors 502.

Additionally, the computing device 500 can include one or more software programs 512, such as the security assessment tool 108. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data, for example, utilized by one or more software programs 512 can be stored in the one or more memory devices 504 and/or on in the one or more storage devices 510.

In implementations, the computing device 500 can communicate with one or more remote user devices 514 and a network environment 518, such as the network environment 100, via a network 516. The one or more remote user devices 514 can be any types of conventional computing devices. For example, the one or more user devices 514 can be desktops, laptops, servers, etc., or mobile devices, such as smart telephones, tablet computers, cellular telephones, personal digital assistants, etc. The network 516 can be any type of network, such as a local area network, a wide-area network, a virtual private network, the Internet, an intranet, an extranet, a public switched telephone network, an infrared network, a wireless network, and any combination thereof. The network 516 can support communications using any of a variety of commercially-available protocols, such as TCP/IP, OSI, FTP, UPnP, NFS, CIFS, and AppleTalk. The network 516 can be, for example, a local area network, a wide-area network, a virtual private network, the Internet, an intranet, an extranet, a public switched telephone network, an infrared network, a wireless network, and any combination thereof.

In implementations, the computing device 500 can exchange data with the one or more user devices 514 and the network environment 518 over the network 516. For example, the computing device 500 can receive requests to perform security assessments and receive data regarding the security assessment requests.

The computing device 500 and the security assessment tool 108 can be implemented as part of at least one service or Web service, such as may be part of a service-oriented architecture. For example, the computing device 500 can exchange data with the one or more user devices 514 during operation of the at least one service or Web service. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

In implementations the computing device 500 can be utilized as part of a Web server architecture. In the Web server architecture, the computing device 500 can run any of a variety of server or mid-tier applications, including HTTP servers, FTP servers, CGI servers, data servers, Java servers, and business application servers. The computing device 500 also can be capable of executing programs or scripts in response requests from the one or more remote user devices 514, such as by executing one or more Web applications that may be implemented as one or more scripts or programs written in any programming language, such as Java®, C, C# or C++, or any scripting language, such as Perl, Python, or TCL, as well as combinations thereof. The computing device 500 can also include database servers, including without limitation those commercially available from Oracle®, Microsoft®, Sybase®, and IBM®.

The computing device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computing device 500 as described above need not be enclosed within a single enclosure or even located in close proximity to one another. Those skilled in the art will appreciate that the above-described componentry are examples only, as the computing device 500 can include any type of hardware componentry, including any necessary accompanying firmware or software, for performing the disclosed implementations. The computing device 500 can also be implemented in part or in whole by electronic circuit components or processors, such as application-specific integrated circuits (ASICs) or field-programmable gate arrays (FPGAs).

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Examples of computer readable storage devices and media include conventional computer system RAM (random access memory), ROM (read-only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection may be through a direct connection, or through an indirect connection via other devices, components, and connections.

What is claimed is:

1. A computer-implemented method for determining an objective security assessment for a network, the method comprising:
    determining potential security threats to computer assets in the network;
    determining an actual deployment of counter measures on the computer assets, wherein determining an actual deployment of counter measures comprises:
        determining security information of the computer assets,
        determining, based at least in part on the security information, at least one of the counter measures deployed on the computer assets, and
        determining, based at least in part on the security information, an actual deployment of the at least one of the counter measures on the computer assets;
    determining, by a processor, an overall security score for the network based at least in part on the actual deployment of the counter measures, an effectiveness of the counter measures, and the potential security threats, wherein determining the overall security score, comprises:
        determining an actual effectiveness score for the at least one of the counter measures deployed on the computer assets based at least in part on the actual deployment of the at least one of the counter measures,
        determining a possible effectiveness score for the at least one of the counter measures, wherein the possible effectiveness score represents deployment of the at least one of the counter measures on each of the computer assets capable of implementing the at least one of the counter measure, and
        determining a security score for the at least one of the counter measures based at least in part on the actual effectiveness score and the possible effectiveness score, wherein the overall security score comprises the security score; and
    outputting the overall security score for the network.

2. The computer-implemented method of claim 1, wherein the security information comprises at least one of identification of security software installed on the computer assets, system settings of the computer assets, security settings of the computer assets, configuration policies of the computer assets, security policies of the computer assets, access information for the computer assets, and details of software installed on the computer assets.

3. The computer-implemented method of claim 1, wherein determining the security information comprises receiving a portion of the security information from a user.

4. The computer-implemented method of claim 1, wherein determining the security information comprises automatically discovering a portion of the security information by probing the network.

5. The computer-implemented method of claim 1, wherein the actual deployment of the at least one of the counter measures comprises a percentage of the computer assets that have deployed the at least one of the counter measures.

6. The computer-implemented method of claim 1, wherein determining the possible effectiveness score, comprises:
   multiplying a weighting factor by the actual deployment of the at least one counter measure, wherein the weighting factor represents an effectiveness of the at least one counter measure in addressing a security threat relative to other counters measures for addressing the security threat.

7. The computer-implemented method of claim 1, wherein determining the security score for the at least one counter measure, comprises:
   dividing the actual effectiveness score by the possible effectiveness score; and
   multiplying, by a scaling factor, a result of dividing the actual effectiveness score by the possible effectiveness score.

8. The computer-implemented method of claim 1, the method further comprising:
   determining an additional security score for at least one other of the counter measures; wherein the overall security score comprises the security score and the additional security score.

9. The computer-implemented method of claim 1, the method further comprising:
   providing at least one recommendation for improving the overall security score.

10. The computer-implemented method of claim 9, wherein the at least one recommendation comprises at least one of deploying a new counter measure, changing a security setting of the computer assets, changing a system setting of the computer assets, changing a security policy of the computer systems, updating software of the computer assets, installing security software on the computer assets, and improving access information for the computer assets.

11. The computer-implemented method of claim 1, wherein the computer assets comprise at least one of a computer system, a virtual machine, and network hardware.

12. The computer-implemented method of claim 1, the method further comprising:
   determining a sub-set of the computer assets;
   determining an actual deployment of counter measures on the sub-set of the computer assets; and
   determining, by a processor, a security score for the actual deployment of counter measures on the sub-set of the computer assets based at least in part on the actual deployment of the counter measures on actual deployment of counter measures on the sub-set of the computer assets, an effectiveness of the counter measures, and the potential security threats.

13. A computer-implemented method for generating a security assessment model, the method comprising:
   determining potential security threats to computer assets in a network;
   determining potential counter measures to address the potential security threats;
   determining effectiveness metrics for the potential counter measures;
   determining, for each of the counter measures, a weighting factors based at least in part on the effectiveness metrics;
   generating, by a processor, an overall security scoring model for the potential security threats and the potential counter measures based at least in part on the weighting factors;
   storing the overall security scoring model in a computer readable storage medium;
   determining a new potential security threat associated with at least one potential counter measure from the potential counter measures;
   determining new effectiveness metrics for the at least one potential counter measure;
   determining, for the at least one potential counter measure, an updated weighting factor based at least in part on the new effectiveness metrics; and
   updating, by the processor, the overall security scoring model based at least in part on the updated weighting factor.

14. The computer-implemented method of claim 13, wherein the effectiveness metrics comprises at least one of ratings of the potential counter measures by security experts, experimental testing of the potential counter measures, and real-world observations of the potential counter measures.

15. A computer-implemented method for generating a security assessment model, the method comprising:
   determining potential security threats to computer assets in a network;
   determining potential counter measures to address the potential security threats;
   determining effectiveness metrics for the potential counter measures;
   determining, for each of the counter measures, a weighting factors based at least in part on the effectiveness metrics;
   generating, by a processor, an overall security scoring model for the potential security threats and the potential counter measures based at least in part on the weighting factors;
   storing the overall security scoring model in a computer readable storage medium;
   determining a new potential counter measure for a potential security threat;
   determining new effectiveness metrics for the new potential counter measure;
   determining, for the new potential counter measure, a new weighting factor based at least in part on the new effectiveness metrics for the new potential counter measure; and
   updating, by the processor, the overall security scoring model based at least in part on the new weighting factor the new effectiveness metrics for the new potential counter measure.

16. The computer-implemented method of claim 15, the method further comprising:

updating at least one of the weighting factors for the potential counter measures based at least in part on the determination of the new potential counter measure and new effectiveness metrics.

17. A system for determining an objective security assessment, the system comprising:
   a network interface to a network of computer assets;
   one or more memory device storing instructions; and
   one or more processors coupled to the network interface and the one or more memory devices, the one or more processors being configured to execute the instructions to perform a method comprising:
      determining potential security threats to the computer assets in the network;
      determining an actual deployment of counter measures on the computer assets, wherein determining an actual deployment of counter measures comprises:
         determining security information of the computer assets,
         determining, based at least in part on the security information, at least one of the counter measures deployed on the computer assets, and
         determining, based at least in part on the security information, an actual deployment of the at least one of the counter measures on the computer assets;
      determining an overall security score for the network based at least in part on the actual deployment of the counter measures, an effectiveness of the counter measures, and the potential security threats, wherein determining the overall security score, comprises:
         determining an actual effectiveness score for the at least one of the counter measures deployed on the computer assets based at least in part on the actual deployment of the at least one of the counter measures,
         determining a possible effectiveness score for the at least one of the counter measures, wherein the possible effectiveness score represents deployment of the at least one of the counter measures on each of the computer assets capable of implementing the at least one of the counter measures, and
         determining a security score for the at least one of the counter measures based at least in part on the actual effectiveness score and the possible effectiveness score, wherein the overall security score comprises the security score; and
      outputting the overall security score for the network.

18. The system of claim 17, wherein the security information comprises at least one of identification of security software installed on the computer assets, system settings of the computer assets, security settings of the computer assets, configuration policies of the computer assets, security policies of the computer assets, access information for the computer assets, and details of software installed on the computer assets.

19. The system of claim 17, wherein determining the security information comprises receiving a portion of the security information from a user.

20. The system of claim 17, wherein determining the security information comprises automatically discovering, via the network interface, a portion of the security information by probing the network.

21. The system of claim 17, wherein the actual deployment of the at least one of the counter measures comprises a percentage of the computer assets that have deployed the at least one of the counter measures.

22. The system of claim 17, wherein determining the possible effectiveness score, comprises:
   multiplying a weighting factor by the actual deployment of the at least one counter measure, wherein the weighting factor represents an effectiveness of the at least one counter measure in addressing a security threat relative to other counters measures for addressing the security threat.

23. The system of claim 17, wherein determining the security score for the at least one counter measure, comprises:
   dividing the actual effectiveness score by the possible effectiveness score; and
   multiplying, by a scaling factor, a result of dividing the actual effectiveness score by the possible effectiveness score.

24. The system of claim 17, the method further comprising:
   providing at least one recommendation for improving the overall security score.

25. The system of claim 17, the method further comprising:
   determining a sub-set of the computer assets;
   determining an actual deployment of counter measures on the sub-set of the computer assets; and
   determining, by a processor, a security score for the actual deployment of counter measures on the sub-set of the computer assets based at least in part on the actual deployment of the counter measures on actual deployment of counter measures on the sub-set of the computer assets, an effectiveness of the counter measures, and the potential security threats.

26. A non-transitory computer readable storage medium comprising instructions for causing one or more processors to perform a method for determining an objective security assessment, the method comprising:
   determining potential security threats to computer assets in a network;
   determining an actual deployment of counter measures on the computer assets, wherein determining an actual deployment of counter measures comprises:
      determining security information of the computer assets,
      determining based at least in part on the security information, at least one of the counter measures deployed on the computer assets, and
      determining, based at least in part on the security information, an actual deployment of the at least one of the counter measures on the computer assets;
   determining an overall security score for the network based at least in part on the actual deployment of the counter measures, an effectiveness of the counter measures, and the potential security threats, wherein determining the overall security score, comprises:
      determining an actual effectiveness score for the at least one of the counter measures deployed on the computer assets based at least in part on the actual deployment of the at least one of the counter measures,
      determining a possible effectiveness score for the at least one of the counter measures, wherein the possible effectiveness score represents deployment of the at least one of the counter measures on each of the computer assets capable of implementing the at least one of the counter measures, and
      determining a security score for the at least one of the counter measures based at least in part on the actual effectiveness score and the possible effectiveness score, wherein the overall security score comprises the security score; and
   outputting the overall security score for the network.

27. The non-transitory computer readable storage medium of claim 26, wherein the security information comprises at least one of identification of security software installed on the computer assets, system settings of the computer assets, security settings of the computer assets, configuration policies of the computer assets, security policies of the computer assets, access information for the computer assets, and details of software installed on the computer assets.

28. The non-transitory computer readable storage medium of claim 26, wherein determining the security information comprises receiving a portion of the security information from a user.

29. The non-transitory computer readable storage medium of claim 26, wherein determining the security information comprises automatically discovering, via the network interface, a portion of the security information by probing the network.

30. The non-transitory computer readable storage medium of claim 26, wherein the actual deployment of the at least one of the counter measures comprises a percentage of the computer assets that have deployed the at least one of the counter measures.

31. The non-transitory computer readable storage medium of claim 26, wherein determining the possible effectiveness score, comprises:
    multiplying a weighting factor by the actual deployment of the at least one counter measure, wherein the weighting factor represents an effectiveness of the at least one counter measure in addressing a security threat relative to other counters measures for addressing the security threat.

32. The non-transitory computer readable storage medium of claim 26, wherein determining the security score for the at least one counter measure, comprises:
    dividing the actual effectiveness score by the possible effectiveness score; and
    multiplying, by a scaling factor, a result of dividing the actual effectiveness score by the possible effectiveness score.

33. The non-transitory computer readable storage medium of claim 26, the method further comprising:
    providing at least one recommendation for improving the overall security score.

34. The non-transitory computer readable storage medium of claim 26, the method further comprising:
    determining a sub-set of the computer assets;
    determining an actual deployment of counter measures on the sub-set of the computer assets; and
    determining, by a processor, a security score for the actual deployment of counter measures on the sub-set of the computer assets based at least in part on the actual deployment of the counter measures on actual deployment of counter measures on the sub-set of the computer assets, an effectiveness of the counter measures, and the potential security threats.

* * * * *